United States Patent
Uehara et al.

(10) Patent No.: US 6,480,544 B1
(45) Date of Patent: Nov. 12, 2002

(54) ENCODING APPARATUS AND ENCODING METHOD

(75) Inventors: Kenji Uehara; Yoshihiro Murakami, both of Kanagawa; Shigeto Funado, Tokyo; Osamu Matsunaga, Kanagawa; Shigeo Fujishiro, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/513,586

(22) Filed: Feb. 25, 2000

Related U.S. Application Data

(63) Continuation of application No. PCT/JP99/03477, filed on Jun. 29, 1999.

(30) Foreign Application Priority Data

Jun. 29, 1998 (JP) ............................................. 10-182473

(51) Int. Cl.⁷ .............................. H04B 1/66; H04N 7/12
(52) U.S. Cl. ............................... 375/240.16; 348/416.1; 375/240
(58) Field of Search .......................... 348/402.1, 409.1, 348/411.1, 412.1, 415.1, 416.1, 699.1; 375/240, 240.15, 240.16; H04N 7/12; H04B 1/66

(56) References Cited

U.S. PATENT DOCUMENTS

| | | | |
|---|---|---|---|
| 4,862,264 A | 8/1989 | Wells et al. | 348/415 |
| 5,418,570 A | 5/1995 | Ueno et al. | 348/413 |
| 5,436,665 A | 7/1995 | Ueno et al. | 348/413 |
| 5,565,921 A * | 10/1996 | Sasaki et al. | 348/409 |
| 5,677,735 A | 10/1997 | Ueno et al. | 348/412 |
| 5,689,307 A * | 11/1997 | Sugahara et al. | 348/419 |
| 5,748,784 A * | 5/1998 | Sugiyama | 382/236 |
| 5,786,859 A * | 7/1998 | Ueno et al. | 348/416 |
| 5,805,222 A | 9/1998 | Nakagawa et al. | 348/401 |
| 5,909,252 A * | 6/1999 | Ueda et al. | 348/416 |
| 5,978,514 A * | 11/1999 | Yamaguchi et al. | 382/243 |
| 6,081,551 A * | 6/2000 | Etoh | 375/240 |
| 6,088,061 A * | 7/2000 | Katata et al. | 348/409 |

FOREIGN PATENT DOCUMENTS

| | | |
|---|---|---|
| EP | 0 250 533 B1 | 1/1988 |
| EP | 0 631 444 A1 | 12/1994 |
| EP | 0 798 930 A2 | 10/1997 |
| JP | 63-502074 | 8/1988 |
| JP | 5-308631 | 11/1993 |
| JP | 7-30901 | 1/1995 |
| JP | 7-95566 | 4/1995 |
| JP | 7-212761 | 8/1995 |
| JP | 9-271026 | 10/1997 |
| JP | 10-108197 | 4/1998 |
| WO | WO 87/04033 | 7/1987 |
| WO | WO 93/18618 | 9/1993 |

* cited by examiner

*Primary Examiner*—Howard Britton
*Assistant Examiner*—Tung Vo
(74) *Attorney, Agent, or Firm*—Frommer Lawrence & Haug, LLP.; William S. Frommer

(57) ABSTRACT

In an encoding apparatus for processing a video signal with a signal processing circuit, producing coefficient data by an orthogonal transform of differential data obtained by motion compensation, generating coded data by quantization of the coefficient data and converting the quantization step size at the time of the quantization according to the amount of generated data of the coded data, the signal processing circuit includes: a motion vector detecting circuit for detecting a motion vector of the video signal; a motion code vector amount detecting circuit for calculating the code amount of the motion vector on the basis of the motion vector and for detecting the amount of code of the coefficient data; and a pixel number converting circuit for converting the number of pixels of the video signal according to the amount of code of the motion vector and the amount of code of the coefficient data.

6 Claims, 2 Drawing Sheets

ENCODING APPARATUS AND ENCODING METHOD

This is a continuation of copending International Application PCT/JP99/03477 having an international filing date of Jun. 29 1999.

TECHNICAL FIELD

This invention relates to an encoding apparatus and an encoding method, and is applicable to the encoding of a video signal based on a format of the MPEG (moving picture experts group).

BACKGROUND ART

In a conventional encoding apparatus which performs encoding processing in accordance with the MPEG format, by switching the quantization step size or frequency characteristic of a prefilter in accordance with the amount of generated code, a video signal can be compressed and encoded at a desired bit rate.

In FIG. 2, a conventional encoding apparatus is illustrated by numeral 1. A digital video signal DV in a predetermined format is outputted to a prefilter 2. The prefilter 2 subjects the digital video signal DV to band limitation processing in accordance with a band limitation signal supplied from a rate control circuit 3 and transmits it to a pixel number converting circuit 4.

The pixel number converting circuit 4 thins out the digital video signal DV at intervals of a predetermined number of pixels so that the number of pixels of the digital video signal DV is converted to a pre-fixed number of pixels, and transmits it to a preprocessing circuit 5 of an encoding unit 19. The preprocessing circuit 5 first designates according to a predetermined sequence as which picture type it should process each frame image of the digital video signal DV with its converted number of pixels inputted sequentially in order of raster scan, among three picture types: I-(intra) picture, P-(predictive) picture, or B-(bi-directionally predictive) picture. Then, the preprocessing circuit 5 reorders the frame images in order of encoding according to the designated picture type, divides them into macroblocks which are composed of a luminance signal of 16 pixels×16 lines and a color difference signal corresponding to the luminance signal, and then transmits them as image data per macroblock in order of block scan to a subtractor 6.

The subtractor 6 is supplied with predictive image data from a motion compensation circuit 7 in addition to the image data per macroblock from the preprocessing circuit 5. When the image data in macroblock is of I-picture, it is transmitted as it is to a DCT (discrete cosine transform) circuit 8. Or when the image data is of P-picture or B-picture, differential data between the image data and predictive image data is transmitted to the DCT circuit 8.

The DCT circuit 8 subjects the image data or the differential data supplied from the subtractor 6 to discrete cosine transform processing, and transmits the resultant coefficient data to a quantizing circuit 9. The quantizing circuit 9 quantizes the coefficient data supplied from the DCT circuit 8 in accordance with a quantization step size on a quantization table set by a rate circuit 3, and transmits it to a variable-length encoding circuit 10 and an inverse quantizing circuit 12.

The variable-length encoding circuit 10 variable-length-encodes the output data from the quantizing circuit 9 and transmits it as encoded data to a buffer 11. The buffer 11 once stores the encoded data therein and outputs it at a constant data transfer rate. The buffer 11 outputs the encoded data with a predetermined format along with the motion vector detected and coded by a motion vector detecting circuit 16, the quantization table of the quantizing circuit 9, and data on the picture type of image data designated by the preprocessing circuit 5. In the encoding apparatus 1, the output data from the buffer 11 is supplied as a video stream to, for example, a following multiplexing unit (not shown).

The inverse quantizing circuit 12 inverse-quantizes the output data from the quantizing circuit 9 so as to restore the original coefficient data inputted to the quantizing circuit 9 and transmits it to an inverse DCT circuit 13. The inverse DCT circuit 13 performs inverse discrete cosine transform on the output data from the inverse quantizing circuit 12 so as to restore the original image data inputted to the DCT circuit 8, and transmits it to an adder 14.

The adder 14 stores the image data from the inverse DCT circuit 13 directly into a frame memory 15 if the supplied data is of I-picture, and holds it as image data which is necessary for the prediction of such as P-picture which follows.

The adder 14 adds image data supplied from the inverse DCT circuit 13 and the predictive image data supplied from the motion compensation circuit 7 if the supplied data is of P-picture so as to restore the original image data inputted in the subtractor 6, and stores the restored image data in the frame memory 15.

The motion vector detecting circuit 16 detects the motion vector of image data supplied at every macroblock of P-picture or B-picture from the preprocessing circuit 5 according to, for example, a block matching algorithm, and transmits it to the motion compensation circuit 7. The motion compensation circuit 7 reads out image data from the frame memory 15 depending on a timing corresponding to the motion vector detected by the motion vector detecting circuit 16, and outputs the read image data as predictive image data to the subtractor 6.

The rate control circuit 3 constantly observes a vacant region in the buffer 11, controls the frequency characteristics of the prefilter 2 depending on the vacant region, rewrites the quantization table of the quantizing circuit 9 and controls the quantization step size. Furthermore, an en coding unit control circuit 18 sets the detecting range of the motion vector in the motion vector detecting circuit 16, and controls the operation timing of the entire encoding unit 19 indicated with a broken line.

In practice, when encoding the digital video signal DV with violent motion, the encoding apparatus 1 increases the band limitation amount of the prefilter 2 and enlarges the quantization step size of the quantizing circuit 9. In this way, encoding is performed almost with the same amount of generated code as that of the digital video signal DV with less motion.

With this configuration, the encoding apparatus 1 reduces, by increasing the band limitation amount in the prefilter 2 and enlarging the quantization step size in the quantizing circuit 9, the amount of code generated when the digital video signal DV with violent motion is encoded almost to the same amount as generated when the digital video signal DV with less motion is encoded. On the other hand, enlarging the quantization step size has extremely deteriorated the image quality because of worsened quantization.

DISCLOSURE OF INVENTION

The present invention has been made in view of the above, and thus the object of the invention is to provide an encoding apparatus and an encoding method that dramatically improve the image quality when encoding a video signal with violent motion, compared with the prior art.

In order to solve the above problem, there is provided an encoding apparatus for processing a video signal with a signal processing unit, producing coefficient data by an orthogonal transform of differential data obtained by motion compensation, generating coded data by quantization of the coefficient data and switching the quantization step size at the time of the quantization according to the amount of generated data of the coded data. The signal processing circuit comprises: a motion vector detecting means for detecting a motion vector of the video signal; a motion vector code amount detecting means for detecting the amount of code of the motion vector on the basis of the motion vector; a coefficient data code amount detecting means for detecting the amount of code of the coefficient data; and a pixel number converting means for converting the number of pixels of the video signal according to the amount of code of the motion vector and the amount of code of the coefficient data.

The present invention is also provided with an encoding method for processing a video signal by predetermined signal processing; producing coefficient data by an orthogonal transform of differential data obtained by motion compensation; generating coded data by quantization of the coefficient data and switching the quantization step size at the time of the quantization according to the amount of generated data of coded data. The signal processing comprises the steps of: detecting a motion vector of the video signal; detecting the amount of code of the motion vector based on the detected motion vector and detecting the amount of code of the coefficient data; and converting the number of pixels of the video signal on the basis of the amount of code of the motion vector and the amount of code of the coefficient data.

As described above, the number of pixels of the video signal is reduced at intervals of predetermined number of pixels on the basis of the amount of code of the motion vector and the code amount of the coefficient data. This makes it possible to reduce the number of pixels on an accurate judgement based on the amount of code of the motion vector and the amount of code of the coefficient data that the motion of the video signal is violent. As a result, a video signal with its number of pixels reduced has less amount of generated code so that the quantization step size is switched moderately and image quality deterioration can be avoided. Thus, it is possible to provide an encoding apparatus and an encoding method that dramatically improve the image quality compared with the prior art when encoding a video image with violent motion.

BEST MODE FOR CARRYING OUT THE INVENTION

Embodiments of the present invention will be described in detail with respect to the drawings.

Figure 1:
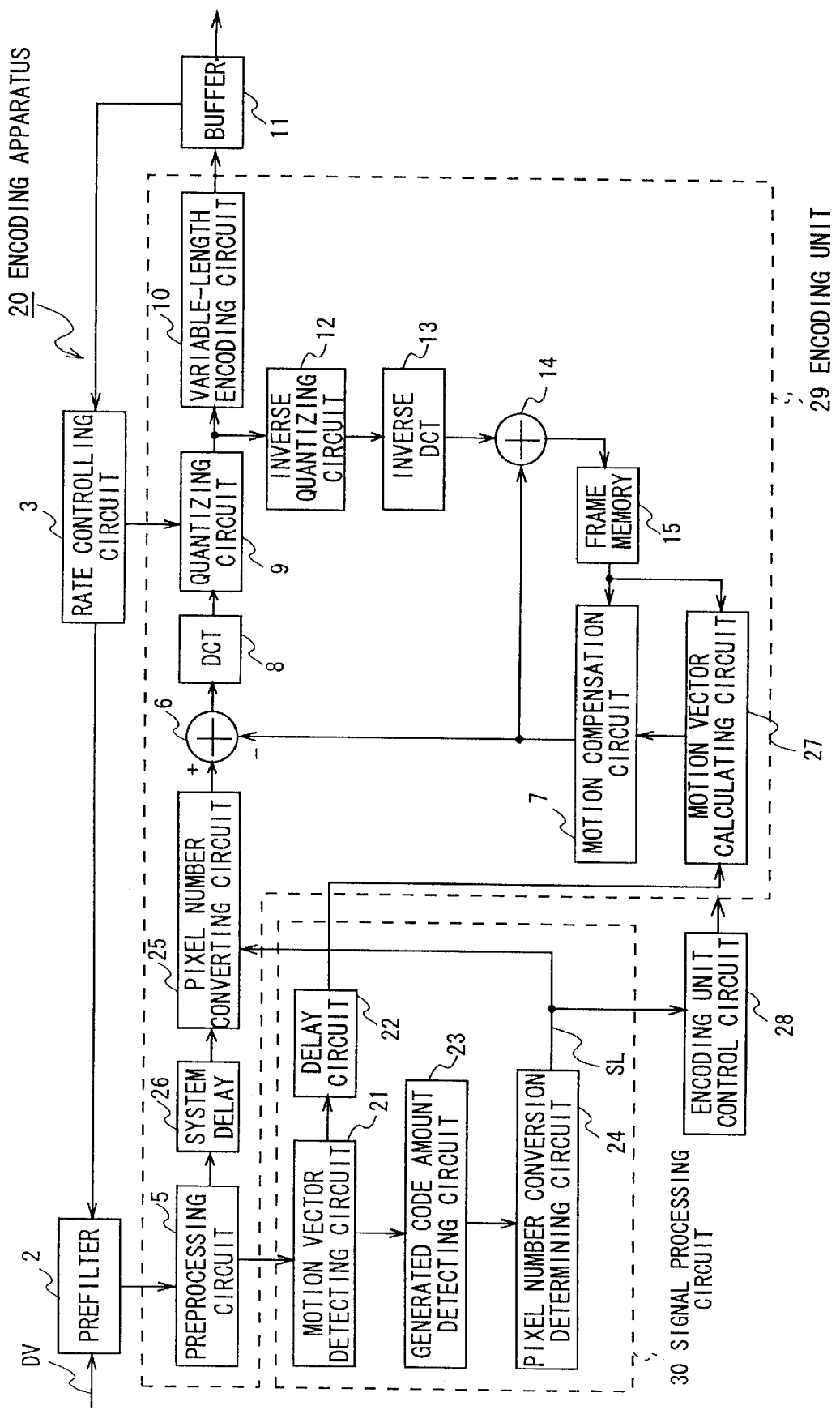
FIG. 1 is a block diagram showing the configuration of an encoding apparatus according to the embodiment of the present invention.
Figure 2:
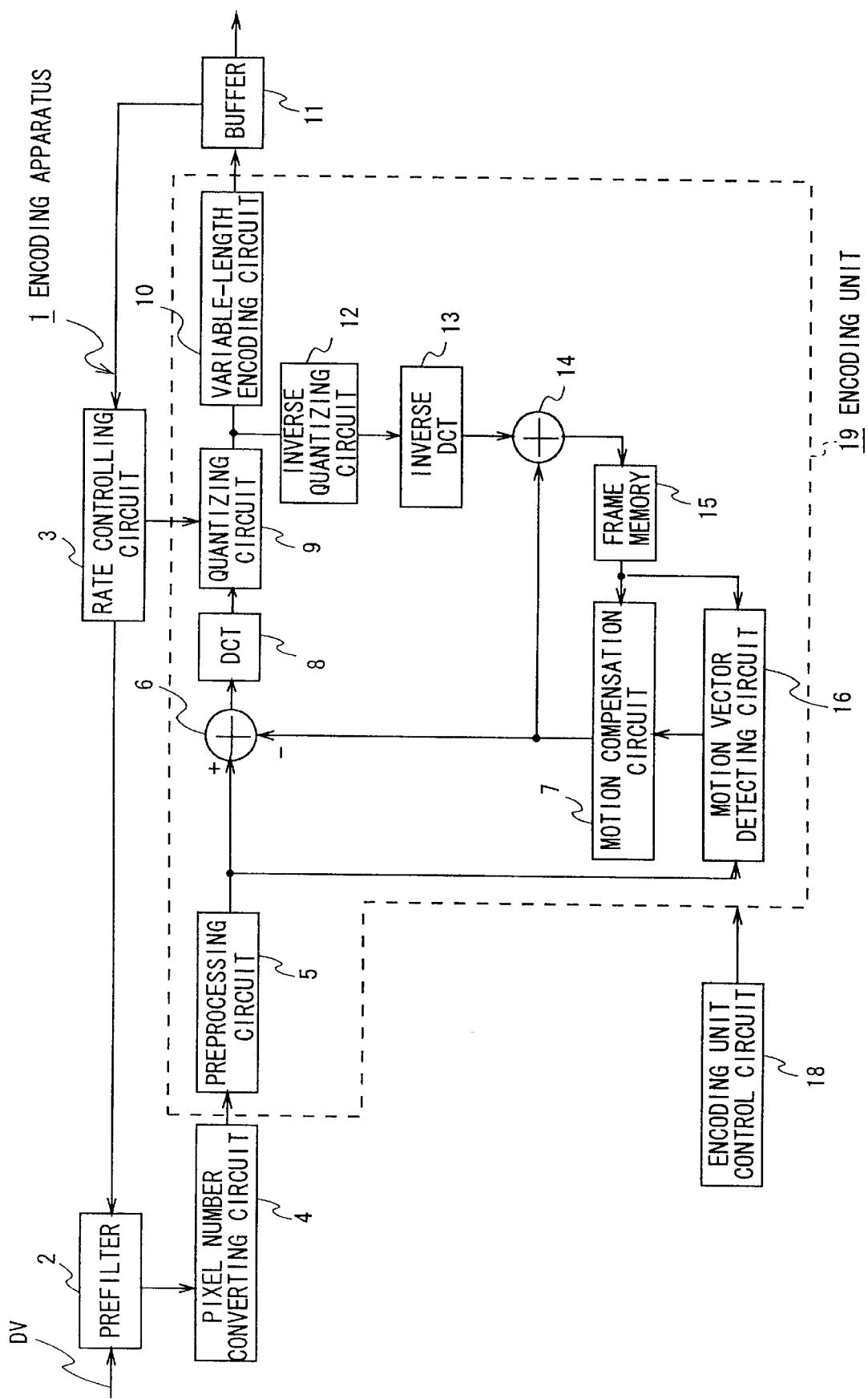
FIG. 2 is a block diagram showing the configuration of an encoding apparatus according to the prior art.

In FIG. 1 in which the same numerals are given to the parts corresponding to those in FIG. 2, an encoding apparatus according to the present invention is indicated by 20. A digital video signal DV in a predetermined format is inputted to a prefilter 2. The prefilter 2 performs band-limitation on the digital video signal DV in accordance with a band-limitation signal supplied from a rate control circuit 3 and transmits it to a preprocessing circuit 5.

The preprocessing circuit 5 first designates according to a pre-set sequence as which picture type it should process each frame image of the digital video signal DV inputted sequentially in order of raster scan from among three picture types: I-(intra) picture, P-(predictive) picture, or B-(bi-directionally predictive) picture. Then, the preprocessing circuit 5 reorders the frame images according to the designated picture type in order of encoding, divides them into macroblocks which are composed of a luminance signal of 16 pixels×16 lines and a color difference signal corresponding to the luminance signal, and sequentially transmits them as image data per macroblock in order of block scan to a motion vector detecting circuit 21 as a motion vector detecting means in a signal processing circuit 30 and a system display 26 of the encoding unit 29.

The motion vector detecting circuit 21 sequentially detects the motion vectors of each macroblock on the basis of a luminance signal out of image data supplied from the preprocessing circuit 5 according to the block matching algorithm, and transmits them to a generated code amount detecting circuit 23 and a delay circuit 22. At the same time, the motion vector detecting circuit 21 accumulates differential data resulting from the detection of the motion vector, that is, absolute value of predictive error and transmits the accumulated value to the generated code amount detecting circuit 23 as a means of detecting motion vector code amount and a means of detecting coefficient data code amount.

The generated code amount detecting circuit 23 calculates and predicts the amount of code of the motion vector outputted from the buffer 11 per frame based on the motion vector detected by the motion vector detecting circuit 21 and also calculates and predicts the amount of code of the coefficient data generated during discrete cosine transform processing in the DCT circuit 8 based on the accumulated value of the predictive error detected by the motion vector detecting circuit 21.

The generated code amount detecting circuit 23 accumulates the result of the addition of the amount of code of motion vector per frame and the amount of code of coefficient data per GOP (group of picture) and transmits the accumulated result per GOP to a pixel number conversion determining circuit 24.

The pixel number conversion determining circuit 24 compares the accumulated value per GOP calculated by the generated code amount detecting circuit 23 with a predetermined threshold value and transmits the compared result as a pixel number converting signal SL to a pixel number converting circuit 25 and encoding unit control circuit 28.

The system delay circuit 26 temporarily stores the image data supplied from the preprocessing circuit 5, and transmits the stored data to the pixel number converting circuit 25 depending on the timing when the pixel number converting signal SL is inputted from the pixel number conversion determining circuit 24 to pixel number converting circuit 25.

The pixel number converting circuit 25 as a means of converting the number of pixels is composed of r ate converting filters which are for changing the characteristics according to the pixel number converting signal SL, and thins out the number of pixels of the image data in GOP at predetermined intervals to make reduction of it, on the basis of the pixel number switching signal SL in the case that the accumulation result per GOP calculated by the generated code amount detecting circuit 23 is larger than the predetermined threshold value (that is, the case that GOP with violent motion has relatively a larger amount of generated code than that of other GOPs), then outputs the resultant to a subtractor 6.

On the other hand, the pixel number converting circuit 25 outputs on the basis of the pixel number converting signal SL the image data as it is without thinning it out to the subtractor 6, in the case that the accumulation result per GOP calculated by the generated code amount detecting circuit 23 is less than that of the predetermined threshold value (that is, the case that GOP with violent motion has relatively less amount of generated code than that of other GPOS).

Further, the pixel number converting circuit 25 reconstructs the macroblocks according to the reduced number of pixels when the number of pixels of the image data is reduced, so as to output the image data per reconstructed macroblock. This allows the encoding apparatus 20 to reduce the number of macroblocks for the reduced number of pixels of the image data and also reduce the number of motion vectors to be transmitted. In addition, when the number of pixels is reduced, the pixel number converting circuit 25 limits the band for the reduced number, which prevents noise from being made.

The delay circuit 22 temporarily holds the motion vectors detected sequentially by the motion vector detecting circuit 21, and delays by the time taken for the generated code amount detecting circuit 23 and pixel number determining circuit 24 to complete their processing and transmits the delayed motion vector to a motion vector calculating circuit 27 as a means of calculating motion vector.

The motion vector calculating circuit 27 inputs the motion vectors sequentially supplied from the delay circuit 22 and generates a new motion vector necessary for motion compensation of the image data when the number of pixels is converted with the inputted motion vector.

Therefore, the motion vector calculating circuit 27 operates together with the pixel number converting circuit 25 according to the pixel number switching signal SL supplied from the encoding unit control circuit 28. If no reduction in the number of pixels is made in the pixel number converting circuit 25, the motion vector supplied from the delay circuit 22 is transmitted as it is to a motion compensation circuit 7.

If the number of pixels is reduced by the pixel number converting circuit 25, however, the motion vector calculating circuit 27 selectively obtains the motion vector corresponding to the macroblock which is reconstructed according to the reduced number of pixels, corrects the obtained motion vector for the reduced number of pixels, and transmits it as another new motion vector to the motion compensation circuit 7.

For example, when the number of pixels in the horizontal direction is converted from a value r to a value s (r>s) in the pixel number converting circuit 25, the motion vector calculating circuit 27 calculates a new motion vector VH which is corrected to the horizontal direction by an arithmetic operation given by the following equation.
[Equation 1]

$$VH = \text{horizontal motion vector at pixel number } r \times s/r \quad (1)$$

When the number of pixels in the vertical direction is converted from a value t to a value u (t>u) in the pixel number converting circuit 25, the motion vector calculating circuit 27 calculates a new motion vector VV which is corrected by an arithmetic operation given by the following equation.
[Equation 2]

$$VV = \text{vertical motion vector at pixel number } t \times u/t \quad (2)$$

The motion compensation 7 reads the image data from a frame memory 15 depending on the timing corresponding to the motion vector or the new vector from the motion vector calculating circuit 27 and outputs the read image data as predictive image data to the subtractor 6.

The subtractor 6 is supplied with the image data with its number of pixels reduced or the image data with its number of pixels not reduced and also supplied with the predictive image data from the motion compensation circuit 7. If the supplied image data is of I-picture, the subtractor 6 transmits it as it is to the DCT (Discrete Cosine Transform) circuit 8. Or if the supplied image data is of P-picture or B-picture, the subtractor 6 transmits differential data between the supplied image data and the predictive image data to the DCT circuit 8.

The DCT circuit 8 performs discrete cosine transform on the image data or the differential data supplied from the subtractor 6, and transmits the resultant coefficient data to a quantizing circuit 9. The quantizing circuit 9 quantizes the coefficient data outputted from the DCT circuit 8 in accordance with a quantization step size on a quantization table set by a rate controlling circuit 3, and transmits it to the variable-length encoding circuit 10 and inverse quantizing circuit 12.

The variable-length encoding circuit 10 performs variable length encoding on the outputted data from the quantizing circuit 9, and transmits it as coded data to the buffer 11. The buffer 11 once stores the coded data therein, then outputs it at a constant data transfer rate.

At the same time, the buffer 11 outputs the encoded data in a predetermined format along with the motion vector or the new motion vector detected and coded by the motion vector detecting circuit 27, the quantization table of the quantizing circuit 9, and data on the picture type of image data designated by the preprocessing circuit 5. In the encoding apparatus 1, the output data from the buffer 11 is supplied as a video stream to, for example, a following multiplexer (not shown).

The inverse quantizing circuit 12 inverse-quantizez the output data from the quantizing circuit 9 so as to restore the original coefficient data, which was inputted to the quantizing circuit 9, and transmits it to an inverse DCT circuit 13. The inverse DCT circuit 13 performs inverse discrete cosine transform on the output data from the inverse quantizing circuit 12 so as to restore the original image data which was inputted to the DCT circuit 8, and transmits it to an adder 14.

The adder 14 stores the image data from the inverse DCT circuit 13 directly into a frame memory 15 if the supplied data is of I-picture, and holds it as image data which is necessary for the prediction of such as P-picture which follows. The adder 14 adds image data supplied from the inverse DCT circuit 13 and predictive image data supplied from the motion compensation circuit 7 if the supplied data is of P-picture so as to restore the original image data which was inputted in a subtractor 6 and stores the restored image data into the frame memory 15.

The rate control circuit 3 constantly observes a vacant region of the buffer 11, controls the frequency characteristics of the prefilter 2 depending on the vacant region, rewrites the quantization table of the quantizing circuit 9 and controls the quantization step size.

Furthermore, the encoding unit control circuit 28 controls the operation timing of the entire encoding unit 19 indicated with a broken line, sets the detecting range of the motion vector in the motion vector detecting circuit 27, encodes the new motion vector calculated by the motion vector calculating circuit 27 on the basis of the macroblocks reconstructed by the pixel number converting circuit 25, goes through certain processing such as interpolating the encoded new motion vector into the encoded data outputted from the variable-length encoding circuit 10 or interpolating control codes.

According to the above-mentioned configuration, the encoding apparatus 20 first designates one from among three picture types as a picture type to process a frame image of the inputted digital video signal DV, reorders the frame images in order of encoding according to the designated image type, and transmits them as image data per macroblock in order of block scan to the motion vector detecting circuit 21. The motion vector detecting circuit 21 detects the motion vector at every macroblock, and the predictive error used for detecting the motion vector is made into absolute value so as to obtain the accumulation value per frame.

In the encoding apparatus 20, the generated code amount detecting circuit 23 predicts the amount of code of the motion vector outputted from the buffer 11 per frame, and also predicts the amount of code of the coefficient data generated during discrete cosine transform processing on the basis of the accumulation value per frame in the absolute value of the predictive error, then accumulates the addition result of the amount of code of the coefficient data and the amount of data of the motion vector per GOP. The accumulation result is transmitted to the pixel number conversion determining circuit 24.

Afterwards in the encoding apparatus 20, the pixel number conversion determining circuit 24 compares the accumulation value per GOP and the predetermined threshold value. Here, when the amount of code at the time of decoding and transmitting of the image data of each macroblock in the fixed quantization step size in the quantizing circuit 9 is predicted to be larger than the amount of code corresponding to the set threshold value (that is, when the image data in GOP including the frame images with violent motion is encoded), the accumulation result on a unit of GOP is to be larger than the threshold value, which causes the pixel number conversion determining circuit 24 to generate the pixel number converting signal SL which signifies an order to reduce the number of pixels and to output it to the pixel number converting circuit 25.

On the other hand, when the amount of code at the time of decoding and transmitting of the image data of each macroblock in the fixed quantization step size in the quantizing circuit 9 is predicted to be less than the amount of code corresponding to the set threshold value, the accumulation result per GOP is to be smaller than the threshold value, which causes the pixel number conversion determining circuit 24 to generate the pixel number converting signal SL which signifies an order not to convert the number of pixels and to output it to the pixel number converting circuit 25.

The encoding apparatus 20 thins out the number of pixels of the image data at every predetermined interval based on the pixel number converting signal SL to reduce it, when it is certain that the image data in GOP including image data with violent motion is encoded based on the accumulation result per GOP.

In this way, when the image data with its number of pixels converted is of I-picture, it is inputted into the DCT circuit 8 via the subtractor 6, converted into coefficient data through orthogonal transfer by discrete cosine transform by DCT circuit 8, and the coefficient data is quantized by the quantizing circuit 9.

The outputted data from the quantizing circuit 9 undergoes variable length encoding in variable-length encoding circuit 10, and the resultant encoded data is stored in the buffer 11. Further, the outputted data from the quantizing circuit 9 is stored in the frame memory 15 as a reference image of frames following after partly restored by the inverse quantizing circuit 12 and inverse DCT circuit 13.

When the image data with its number of pixels converted is of P-picture or B-picture, the subtractor 6 generates differential data between the image data and the predictive image data, and processes the differential data in the same way as the image data of I-picture in order to generate coded data, which is stored in the buffer 11. In the case of P-picture, during these sets of processing, the outputted data from the quantizing circuit 9 is stored in the frame memory 15 as a reference image of frames following after partly restored, similarly to the case of I-picture.

In this way, the encoding apparatus 20, when processing P-picture or B-picture, supplies the motion vector detected by the motion vector detecting circuit 21 through the delay circuit 22 to the motion vector calculating circuit 27.

At the same time, the motion vector calculating circuit 27 corrects the motion vector sequentially supplied from the delay circuit 22 for the number of pixels reduced by the pixel number converting circuit 25 in order to generate a new vector necessary for motion compensation of the image data in macroblock reconstructed by reduction of the number of pixels.

In this way, a simple configuration as shown in FIG. 1 makes it possible for the encoding apparatus 20 to detect the motion vector supplied for calculating the amount of code outputted from the buffer 11 and the new motion vector necessary for motion compensation with the number of pixels reduced. Normally, this kind of motion vector detecting circuit has such a complicated composition that, when the encoding apparatus is made as an integrated circuit, most of the area on the substrate has to be taken up by the motion vector detecting circuit. However, as in the encoding apparatus 20, generating a new motion vector necessary for motion compensation by taking advantage of the motion vector detected by the motion vector detecting circuit 21 can bring drastic simplification of the entire configuration.

The new motion vector necessary for motion compensation which is thus generated by the motion vector calculating circuit 27 is supplied to the motion compensation circuit 7 in order to generate predictive image data for a predictive frame, undergoes variable-length encoding processing, and is stored in the buffer 11 with encoded data in a corresponding macroblock.

Therefore, in the encoding apparatus 20, for image data with violent motion in GOP which could generate greater amount of code during the quantization processing in a fixed quantization step size, reduction in the amount of generated code is possible by encoding with decreased number of pixels. At the same time, the encoding apparatus can reduce the number of macroblocks for the reduced number of pixels, which results in reducing the number of motion vectors in transmission, which further results in reducing the amount of code in transmission.

The encoding apparatus 20 outputs the encoded data which is encoded and stored in the buffer 11 at a constant data transfer rate and with a rate controlling circuit 3, controls the amount of band limitation of the prefilter 2 and the quantization step size of the quantizing circuit 9 depending on the vacant region in the buffer 11.

Here, the encoding apparatus 20 processes the image data with violent motion in GOP in a manner that it generates less amount of code by reducing the number of pixels before encoding. Thus, converting of the amount of band limitation and the quantization step size can be executed far more moderately than in the prior art though it depends on how much the number of pixels is reduced.

When comparing the data stored in the buffer 11 with that in the encoding apparatus 1 according to the prior art, for both the frame image with violent motion and the frame image with moderate motion, encoding is performed in the way that the amount of generated code in the coefficient data keeps a constant rate in the encoding apparatus 1 according to the prior art. However, in the encoding apparatus 20 according to the present invention, for the frame image with violent motion, the number of pixels is reduced to keep a less amount of generated data. Therefore, converting of the amount of band limitation and the quantization step size can be executed far more moderately compared with the prior art. As a consequence, encoding is performed in a manner that the amount of generated code for the coefficient data of frame image with violent motion becomes larger than that in the encoding apparatus 1.

In addition, in the encoding apparatus 20, the number of macroblocks reconstructed with the reduced number of pixels decreases which leads to the reduction in the number of the motion vectors, the amount of generated code of the reduced motion vector can be allocated to the coefficient data, thereby making it possible to highly improve the overall image quality per frame in GOP with violent motion compared with the prior art.

There could be one way of converting the number of pixels on the basis of an accumulation value by accumulating the absolute value of the interframe differential per frame. In this case, it is possible to discern whether the current frame has made any motion with respect to the preceding frame but it is not possible to discern accurately what kind of influence this motion would have on the amount of code of the motion vector and the amount of code of the coefficient data during encoding. Therefore, even if the motion is judged to be small, the actual amount of the generated motion vector can be larger and vice versa.

However, as in the encoding apparatus 20 of the configuration according to the present invention, the number of pixels of the image data is reduced on the basis of the amount of code of the motion vector and the amount of code of the coefficient data which are obtained by being directly calculated. This means that the reduction in the number of pixels of the image data is made after having accurately discerned that the frame image has a large amount of code and violent motion.

According to the above configuration, the encoding apparatus 20 detects the amount of code of the motion vector and the amount of coefficient data by orthogonal transfer, reduces the number of pixels of the image data based on the amount of code of the motion vector and the amount of code of the coefficient data, and then moderately changes the amount of band limitation and the quantization step size so that decoding is performed. In this way, the image quality in the case that the digital video signal DV including frame images with violent motion is encoded can significantly be improved.

Additionally, in the encoding apparatus 20, as the number of macroblocks that is reconstructed due to the reduction in the number of pixels decreases, the number of motion vectors can be reduced. As a result, the amount of generated code of reduced motion vector can be allocated to the coefficient data, it is possible to significantly improve the general image quality per frame in GOP with violent motion.

In the above-mentioned embodiment, it has described a case where the number of pixels in the horizontal direction is converted from the value r to the value s, and the number of pixels in the vertical direction from the value t to the value u. However, the present invention is not confined thereto. The number of pixels can be converted to various other values than the value s and the value u.

In the above-mentioned embodiment, it has described a case where the number of pixels is converted when the addition result of the amount of code of the motion vector and the amount of code of the coefficient data surpass the threshold value. However, the present invention is not limited thereto. The number of pixels can be changed in accordance with the ratio between the amount of code of motion vector and that of the coefficient data.

In the above-mentioned embodiment, it has described a case where the addition result of the amount of code of the motion vector and that of the coefficient data is accumulated on a unit of GOP, and the number of pixels is changed on a unit of GOP on the basis of the accumulation result on a unit of GOP. However, the present invention is not confined thereto. The number of pixels can be changed on a unit of GOP based on various units if necessary. For example, the number of pixels can be changed on a unit of GOP on the basis of the addition result on a unit of frame of the amount of code of the motion vector and that of the coefficient data per frame. Furthermore, in the above-mentioned embodiment, it has described a case where the amount of code of the coefficient data is detected by predicting with predictive error. However, the present invention is not limited thereto. It is also possible to actually generate coefficient data, detect the amount of code in a fixed quantization step size, and change the number of pixels according to the detected amount of code.

Finally, in the above-mentioned embodiment, it has described a case where the present invention is applied to the encoding apparatus 20 which performs encoding processing based on the format of MPEG. However, the present invention is not confined thereto. It can also be applied widely to various encoding apparatuses which perform, for example, haar transform as an orthogonal transform on a predictive error of motion vector, quantize it, and then transmit it.

Industrial Applicability

The encoding apparatus and the encoding method according to the preset invention are applied to various other encoding apparatuses which perform an orthogonal transform on a predictive error by the detection of motion vector, quantize it, and then transmit it.

What is claimed is:

1. An encoding apparatus for processing a video signal with a signal processing circuit, producing coefficient data by an orthogonal transform of differential data obtained by motion compensation, generating coded data by quantization of said coefficient data and switching the quantization step size at the time of said quantization according to the amount of generated data of said coded data, wherein said signal processing circuit comprising:
motion vector detecting means for detecting a motion vector of said video signal;
motion vector code amount detecting means for calculating the code amount of said motion vector on the basis of said motion vector;
coefficient data code amount detecting means for detecting the amount of code of said coefficient data; and pixel number converting means for converting the number of pixels of said video signal according to the amount of code of said motion vector and the amount of code of said coefficient data.

2. The encoding apparatus according to claim 1, comprising:
motion vector calculating means for calculating a new motion vector which is necessary for motion compensation of a video signal when said number of pixels is converted by said pixel number converting means using said motion vector detected by said motion vector detecting means.

3. The encoding apparatus according to claim 1, wherein said pixel number converting means reconstructs macroblocks according to said converted number of pixels of said video signal when the number of pixels of said video signal is converted.

4. An encoding method for processing a video signal, producing coefficient data by an orthogonal transform of differential data obtained by motion compensation, generating coded data by quantization of said coefficient data and converting the quantization step size at the time of said quantization according to the amount of generated data of said coded data, said signal processing comprising the steps of:
detecting a motion vector of said video signal;
calculating the amount of code of said motion vector on the basis of said detected motion vector and detecting the amount of code of said coefficient data; and
converting the number of pixels of said video signal on the basis of the amount of code of said motion vector and the amount of code of coefficient data.

5. The encoding method according to claim 3, wherein said signal processing calculates a new motion vector necessary for motion compensation of a video signal when said number of pixels is converted using said motion vector.

6. The encoding method according to claim 3, wherein said signal processing reconstructs macroblocks according to the converted number of pixels when the number of pixels of said video signal is converted.

* * * * *